United States Patent [19]

Jones et al.

[11] Patent Number: 4,839,249

[45] Date of Patent: Jun. 13, 1989

[54] LOW TEMPERATURE MOLTEN COMPOSITION COMPRISED OF TERNARY ALKYL SULFONIUM SALTS

[75] Inventors: Steven D. Jones, Brook Park; George E. Blomgren, Lakewood, both of Ohio

[73] Assignee: Eveready Battery Company, Inc., St. Louis, Mo.

[21] Appl. No.: 223,313

[22] Filed: Jul. 25, 1988

[51] Int. Cl.$^4$ .................... H01M 10/39; H01M 10/40
[52] U.S. Cl. ..................................... 429/194; 429/199
[58] Field of Search ............................... 429/194, 199; 204/243 R

[56] References Cited

U.S. PATENT DOCUMENTS

| | | | |
|---|---|---|---|
| 4,122,245 | 10/1978 | Nardi et al. | 429/194 |
| 4,160,070 | 7/1979 | Margalit et al. | 429/194 |
| 4,355,086 | 10/1982 | Saathoff et al. | 429/105 |
| 4,463,071 | 7/1984 | Gifford et al. | 429/194 |
| 4,463,072 | 7/1984 | Gifford et al. | 429/194 |
| 4,482,616 | 11/1984 | Connolly et al. | 429/101 |
| 4,520,084 | 5/1985 | Tinker et al. | 429/101 |
| 4,537,843 | 8/1988 | Shishikura et al. | 429/197 |
| 4,764,440 | 8/1988 | Jones et al. | 429/198 |

FOREIGN PATENT DOCUMENTS 30065 7/1983 Japan.
2150740 7/1985 United Kingdom.

OTHER PUBLICATIONS

Wicelinski, et al., *J. Electrochemical Society* 1987, vol. 134, No. 1, pp. 262–263.

Wilkes et al., *Journal of Inorganic Chemistry* 1982, vol. 21, pp. 1263–1264.

Wilkes et al., *Seiler Research Laboratory Report*, FJSRL-TR-82-0002, 1982.

Stein et al., *Journal of American Chemical Society*, 1981, vol. 103, No. 9, pp. 2192–2198.

Byrne et al., *Tetrahedron Letters*, 1986, vol. 27, No. 11, pp. 1233–1236.

*Primary Examiner*—Donald L. Walton
*Attorney, Agent, or Firm*—Robert W. Welsh

[57] ABSTRACT

Low temperature molten compositions are comprised of a mixture of a metal halide, such as aluminum trichloride, and a ternary alkyl sulfonium salt, such as trimethylsulfonium chloride, and are useful as electrolytes in electrochemical cells.

33 Claims, No Drawings

LOW TEMPERATURE MOLTEN COMPOSITION COMPRISED OF TERNARY ALKYL SULFONIUM SALTS

BACKGROUND OF THE INVENTION

This invention relates to compositions comprising ternary alkyl sulfonium salts which are molten at low temperatures, and to the use of such compositions as electrolytes in electrochemical salts.

A class of molten compositions which is of special interest in the field of electrochemical cells is the class of fused salt compositions which are molten at low temperature and are useful as electrolytes. Such molten or fused salt compositions are mixtures of compounds which are liquid at temperatures below the individual melting points of the components. The mixtures can form molten compositions simultaneously upon contacting the components together or after heating and subsequent cooling.

Some of these molten or fused salt compositions are useful as electrolytes in batteries, photoelectrochemical cells, electrorefining and electroplating. Examples of low temperature molten fused salts are the chloroaluminate salts discussed by Wilkes, J. S., et al; in *J. Inorg. Chem.*, Vol 21, 1263-1264, 1982. Alkyl imidazolium or pyridinium salts are mixed with aluminum trichloride (AlCl$_3$) to form the fused chloroaluminate salts. Also chlorogallate salts made from gallium trichloride and methylethylimidazolium chloride are discussed in Wicelinski et al, "Low Temperature Chlorogallate Molten Salt Systems," *J. Electrochemical Soc.*, Vol. 134, 262-263, 1987. The use of the fused salts of 1-alkyl-pyridinium chloride and aluminum trichloride as electrolytes is discussed in U.S. Pat. No. 4,122,245. Other patents which discuss the use of fused salts from aluminum trichloride and alkylimidazolium halides as electrolytes are U.S. Pat. Nos. 4,463,071; 4,463,072 and Great Britain Patent Application GB No. 2,150,740A. Unfortunately, the alkylimidazolium salts are difficult to prepare, and the alkyl pyridinium salts are too easily reduced in an electrochemical cell system.

Another class of fused salt compositions are the compositions formed from a metal halide and a hydrocarbyl-saturated onium salts containing at least one aromatic group, which are disclosed in U.S. patent application Ser. No. 046,010, now U.S. Pat. No. 4,764,440 which was allowed on Mar. 2, 1988. It would be desirable, however, to have fused salt compositions which exhibit higher conductivities than the fused salt compositions from those hydrocarbylsaturated aromatic-containing onium salts.

In view of the deficiencies of known compositions, other electrolyte compositions which have improved stability or conductivity are desired.

SUMMARY OF THE INVENTION

This invention is a low temperature molten composition comprising a mixture of a metal halide and a ternary alkyl sulfonium salt.

In another aspect this invention is an electrochemical cell comprising an anode, a cathode, a separator and a low temperature molten electrolyte composition comprising a mixture of a metal halide and a ternary alkyl sulfonium salt.

The compositions of this invention provide low temperature molten fused salt compositions which are useful as electrolytes in batteries, electrorefining processes, and electrowinning processes.

DETAILED DESCRIPTION OF THE INVENTION

The low temperature molten compositions of this invention can be referred to as fused salt compositions or ionic aprotic solvents. By "low temperature molten" is meant that the compositions are in liquid form below about 100° C. at standard pressure. Preferably, the molten composition is in liquid form below about 60° C., and more preferably below about 23° C. at standard pressure.

The metal halides useful in this invention are those compounds which can form anions in the presence of the anion from the ternary alkyl sulfonium salt. Preferred metal halides are covalently bonded metal halides. Especially preferred metals are selected from the group comprising aluminum, gallium, and indium with aluminum being most preferred. The corresponding most preferred halide is chloride and therefore, the most preferred metal halide is aluminum trichloride. This metal halide is most preferred because it is readily available and can form chloroaluminate melts containing the polynuclear ion Al$_2$Cl$_7^-$ in the molten salt composition. These chloroaluminate melts are especially useful in secondary electrochemical cells.

The ternary alkyl sulfonium salts used in this invention have alkyl groups substituted on the sulfur. As used herein, "alkyl" means saturated hydrocarbyl groups. Besides being substituted with three separate alkyl groups, the sulfonium cation can form a saturated heterocyclic ring structure wherein two of the alkyl groups form a portion of the heterocyclic ring with the sulfur. Of these saturated heterocyclic cations, tetrahydrothiophene is preferred. Preferably, the alkyl groups are straight or branched chains of suitable size to result in a room temperature molten composition with the metal halides. Short chain alkyl groups are most preferred, because they form low viscosity melts of relatively high conductivity. Especially preferred are methyl and ethyl groups. The most preferred sulfonium salts are substituted completely with methyl groups, or with methyl groups and only one ethyl group.

The sulfonium cation can be represented by the formula:

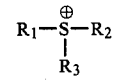

wherein R$_1$, R$_2$ and R$_3$ are alkyl groups, and R$_1$ and R$_2$ can be members of a saturated heterocyclic ring with the sulfur.

The anion of the sulfonium salts can form an anion with the metal halide. Examples of preferred anions are simple halides, such as chloride, bromide, and iodide; and complex halogen-containing ions such as BF$_4^-$, PF$_6^-$, and AsF$_6^-$. More preferably, the simple halides are employed, and of these chloride and iodide are preferred. An example of a preferred saturated heterocyclic sulfonium salt is methyl tetrahydrothiophene chloride. The most preferred ternary alkyl sulfonium salts are trimethylsulfonium iodide and trimethylsulfonium chloride.

The ternary alkyl sulfonium salt and metal halide are employed in an amount sufficient to form a low temperature molten composition which is ionically conductive. If the proper ratio is not employed, a low temperature molten composition will not form. A suitable mole ratio of ternary alkyl sulfonium salt to metal halide can range from about 2:1 to about 1:2. Preferably, the composition comprises a mole ratio of sulfonium salt to metal halide of about 1:1 to about 1:2. In a highly preferred embodiment, the low temperature molten compositions of this invention consist essentially of the metal halide and the ternary alkyl sulfonium salt.

Specifically, the most preferred low temperature molten compositions are mixtures consisting essentially of a mole ratio of trimethylsulfonium iodide or trimethylsulfonium chloride to aluminum trichloride of about 1:2. Such a melt is especially useful in secondary cells, because it can both plate and strip the active metal of the anode.

Typically, the metal halide and ternary alkyl sulfonium salt are solids at low temperature i.e. below about 100° C. at standard pressure, for example, the melting point for trimethylsulfonium chloride is about 192° C., and the trimethylsulfonium iodide sublimes at about 213° C. at standard pressure. $AlCl_3$ sublimes at about 178° C. at standard pressure. After contacting the metal halide with the ternary alkyl sulfonium salt, if the melt does not form spontaneously, the solids can be heated until a substantially homogenous liquid forms. Upon cooling, the molten salt composition remains a liquid at low temperature, i.e. below about 100° C., preferably below about 60° C. and more preferably below about 23° C.. For example, the freezing point of the aluminum trichloride and trimethylsulfonium chloride melt is less than about −50° C.; and the freezing point of the trimethylsulfonium iodide and aluminum trichloride melt is less than about 21° C.

Since the low temperature molten compositions of this invention are ionically conductive, they are useful as electrolytes in electrochemical cells, electrolysis, electrowinning and electrorefining processes. In such processes, an anode, a cathode, and a separator can be employed along with the electrolyte. Although the most preferred embodiment of the invention is a mixture which consists essentially of the metal halide and ternary alkyl sulfonium salt, it may be desirable to employ additional compounds with the molten compositions when using such compositions as electrolytes. For example, it may be desirable to employ a solvent or solute with the molten composition to reduce or increase the viscosity of the composition. Suitable compounds for reducing the viscosity are insert organic solvents, such as benzene. These compounds are inert relative to the molten salt and cell components. Other compounds can be employed to control the formation of substances on the electrodes or to enhance the conductivity of the molten salt composition.

Materials which are as or less active than the metal of the metal halide on the emf scale can be employed as the anode. For example, when employing aluminum trichloride, aluminum metal or materials which are less active relative to aluminum on the emf scale can be employed as the anode. Polymers with conjugated backbones, such as polyacetylene, are also suitable. Examples of suitable active anode materials are Al, Mn, Zn, Cr, Fe and Cd. Preferred active anode materials are Al, Zn, and Cd.

Examples of suitable active cathode materials are manganese dioxide, iron disulfide, polymers with conjugated backbones such as polyacetylene, polyaniline and polythiophene, $TiS_2$, $MoS_3$, $Mo_6Se_6$, $SeO_2$, $PbO_2$ and $V_2O_5$. A conductive agent such as carbon or graphite and a suitable binder for example, polytetrafluoroethylene, can be mixed with the active cathode material to form the cathode electrode. Preferred active cathode materials are those which are substantially insoluble in the electrolyte such as $MnO_2$.

Suitable separator materials are ionically permeable but yet chemically nonreactive with the cell components. Examples are glass fiber mats and porous plastics such as porous polyethylene.

The electrochemical cells can be prepared using the low temperature molten compositions of this invention as electrolytes by following conventional electrochemical cell manufacturing techniques. For example, the anode and cathode are assembled along with a suitable separator, and then the electrolyte is added to complete the cell.

The low temperature molten compositions of this invention are easily prepared and have a melting point below about 100° C. and can exhibit conductivities at room temperature of greater than about 2mS/cm, and preferably greater than about 3 mS/cm. For example, the conductivity of the trimethylsulfonium iodide and aluminum trichloride melt in a 1:2 mole ratio is about 4.5 mC/cm at 25° C. The conductivity of the trimethylsulfonium chloride and aluminum trichloride melt in a 1:2 mole ratio is about 5.5 mS/cm at 25° C. The viscosities of these melts are very close to the viscosity of water. The chloroaluminate melts of this invention can have a comparable or larger electrochemical window compared to melts made from mixtures of aluminum trichloride and methylethylimidazolium chloride. Also, the ternary alkyl sulfonium chloride and aluminum trichloride molten compositions exhibit better ionic conductivity than hydrocarbyl-saturated aromatic-containing onium salts and aluminum trichloride molten compositions.

What is claimed:

1. A low temperature molten composition comprising a mixture of a metal halide and a ternary alkyl sulfonium salt.

2. The composition of claim 1, wherein the metal halide is a covalently bonded metal halide.

3. The composition of claim 2, wherein the metal of the metal halide is selected from the group comprised of aluminum, gallium, and indium.

4. The composition of claim 3, wherein the metal halide is aluminum trichloride.

5. The composition of claim 4, wherein the alkyl groups of the ternary alkyl sulfominum salt are selected from the group consisting of methyl and ethyl groups, and the anion is a halide or a halogen-containing complex ion.

6. The composition of claim 5, wherein the ternary alkyl sulfonium salt is trimethylsulfonium chloride or trimethylsulfonium iodide.

7. The composition of claim 6, which consists essentially of a mole ratio of trimethylsulfonium chloride to aluminum trichloride of 1:2.

8. The composition of claim 4, wherein the ternary alkyl sulfonium salt contains a heterocyclic sulfonium cation.

9. The composition of claim 8, wherein the ternary alkyl sulfonium salt is methyl tetrahydrothiophene chloride.

10. The composition of claim 1, wherein the alkyl groups of the ternary alkyl sulfonium salt are selected from the group consisting of methyl and ethyl groups, and the anion is a halide or a halogen-containing complex ion.

11. The composition of claim 10, wherein the ternary alkyl sulfonium salt is trimethylsulfonium chloride.

12. The composition of claim 10, wherein the ternary alkyl sulfonium salt is trimethylsulfonium iodide.

13. The composition of claim 1, wherein the ternary alkyl sulfonium salt contains a heterocyclic sulfonium cation.

14. The composition of claim 13, wherein the ternary alkyl sulfonium salt is methyl tetrahydrothiophene chloride.

15. An electrochemical cell comprising
   (a) an anode,
   (b) a cathode,
   (c) a separator, and
   (d) a low temperature molten electrolyte composition comprising a mixture of a metal halide and a ternary alkyl sulfonium salt.

16. The electrochemical cell of claim 15, wherein the metal halide is a covalently bonded metal halide.

17. The electrochemical cell of claim 16, wherein the metal halide is aluminum trichloride.

18. The electrochemical cell of claim 17, wherein the alkyl groups of the ternary alkyl sulfonium salt are selected from the group consisting of methyl and ethyl groups, and the anion is a halide or a halogen-containing complex ion.

19. The electrochemical cell of claim 18, wherein the ternary alkyl sulfonium salt is trimethylsulfonium chloride or trimethylsulfonium iodide.

20. The electrochemical cell of claim 19, wherein the electrolyte composition consists essentially of a mole ratio of trimethyl sulfonium chloride to aluminum trichloride of 1:2.

21. The electrochemical cell of claim 20, wherein aluminum is employed as the anode.

22. The electrochemical cell of claim 17, wherein the ternary alkyl sulfonium salt contains a heterocyclic sulfonium cation.

23. The electrochemical cell of claim 20, wherein manganese dioxide is employed as the active cathode material.

24. The electrochemical cell of claim 22, wherein the ternary alkyl sulfonium salt is methyl tetrahydrothiophene chloride.

25. The electrochemical cell of claim 15, wherein the alkyl groups of the ternary alkyl sulfonium salt are selected from the group consisting of methyl and ethyl groups, and the anion is a halide or a halogen-containing complex ion.

26. The electrochemical cell of claim 25, wherein the ternary alkyl sulfonium salt is trimethylsulfonium chloride.

27. The electrochemical cell of claim 25, wherein the ternary alkyl sulfonium salt is trimethylsulfonium iodide.

28. The electrochemical cell of claim 15, wherein the electrolyte composition is further comprised of an inert organic solvent.

29. The electrochemical cell of claim 28, wherein the inert organic solvent is benzene.

30. The electrochemical cell of claim 16, wherein the electrolyte composition exhibits a conductivity of greater than about 2 mS/cm at 25° C.

31. The electrochemical cell of claim 30, wherein the electrolyte composition exhibits a conductivity of greater than about 3 mS/cm at 25° C.

32. The electrochemical cell of claim 15, wherein the ternary alkyl sulfonium salt contains a heterocyclic sulfonium cation.

33. The electrochemical cell of claim 32, wherein the ternary alkyl sulfonium salt is methyl tetrahydrothiophene chloride.

* * * * *